March 14, 1944. W. LEATHERS ET AL 2,344,254
TELEMETERING APPARATUS
Filed Jan. 27, 1943 3 Sheets-Sheet 1
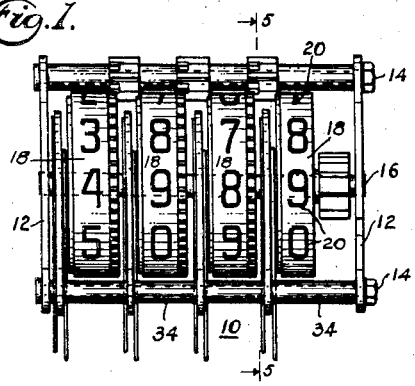
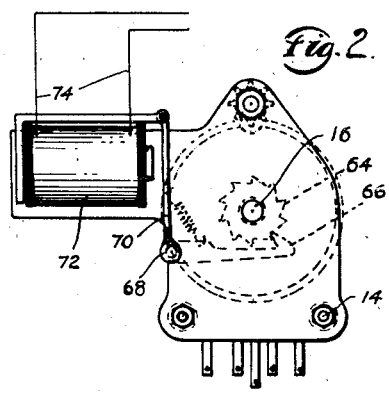
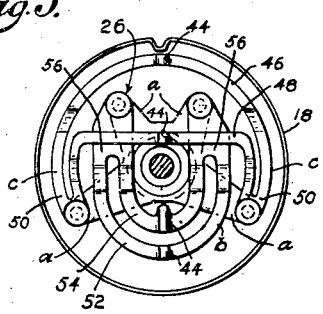
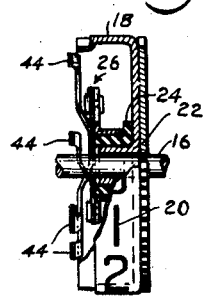
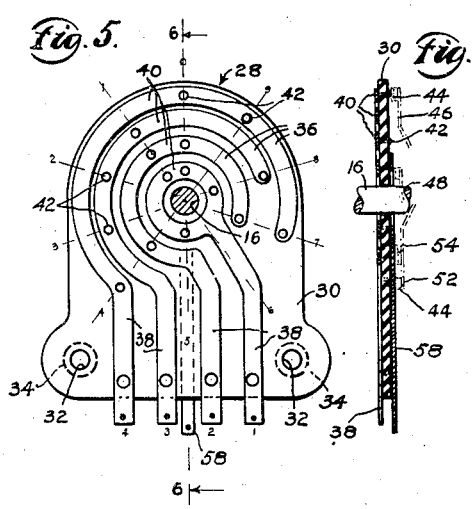
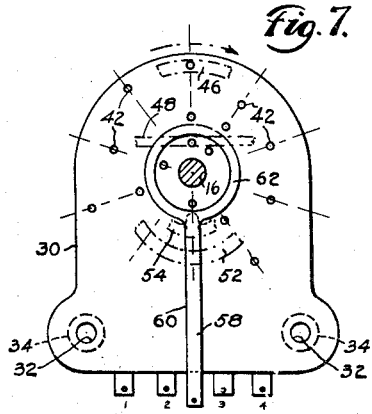
INVENTORS:
Ward Leathers,
Hugo Panissidi
BY
ATTORNEY March 14, 1944.   W. LEATHERS ET AL   2,344,254
TELEMETERING APPARATUS
Filed Jan. 27, 1943   3 Sheets-Sheet 2
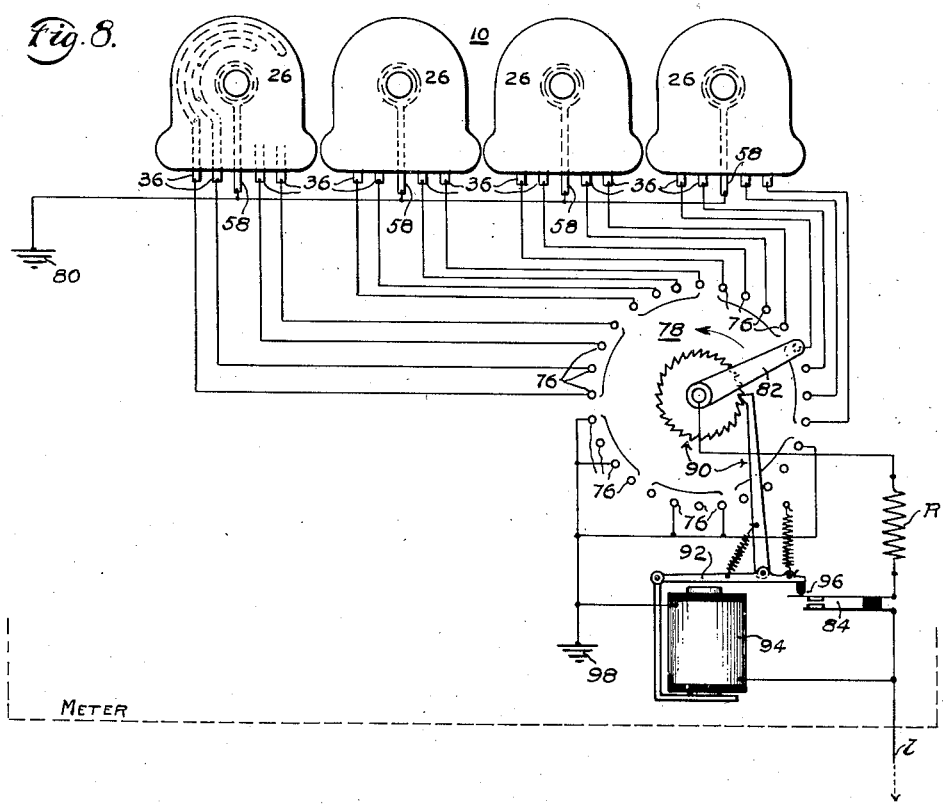
Fig. 8.
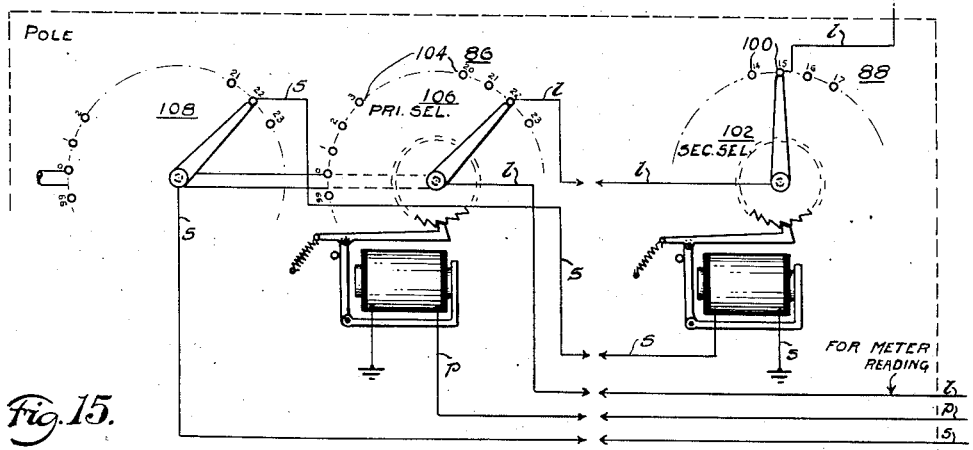
Fig. 9.
Fig. 15.
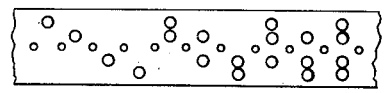
INVENTORS:
Ward Leathers,
Hugo Panissidi.
BY
ATTORNEY March 14, 1944.    W. LEATHERS ET AL    2,344,254
TELEMETERING APPARATUS
Filed Jan. 27, 1943    3 Sheets-Sheet 3
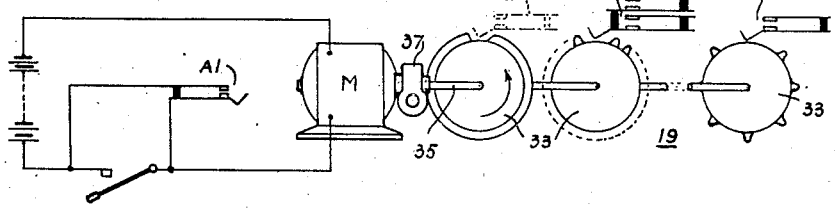
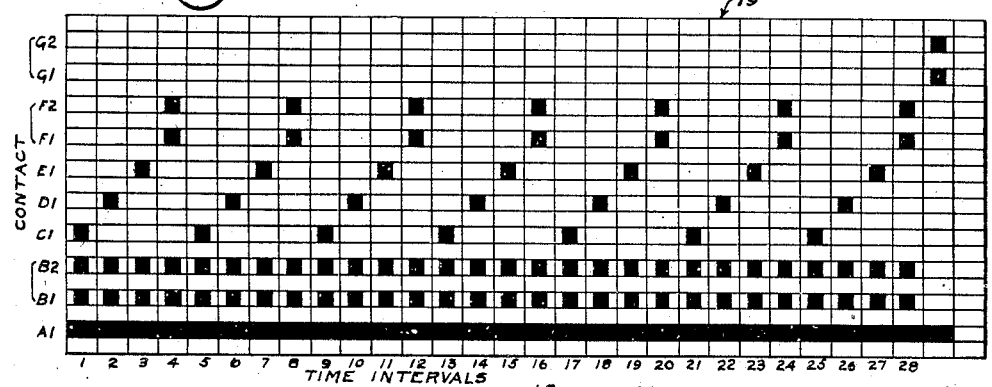
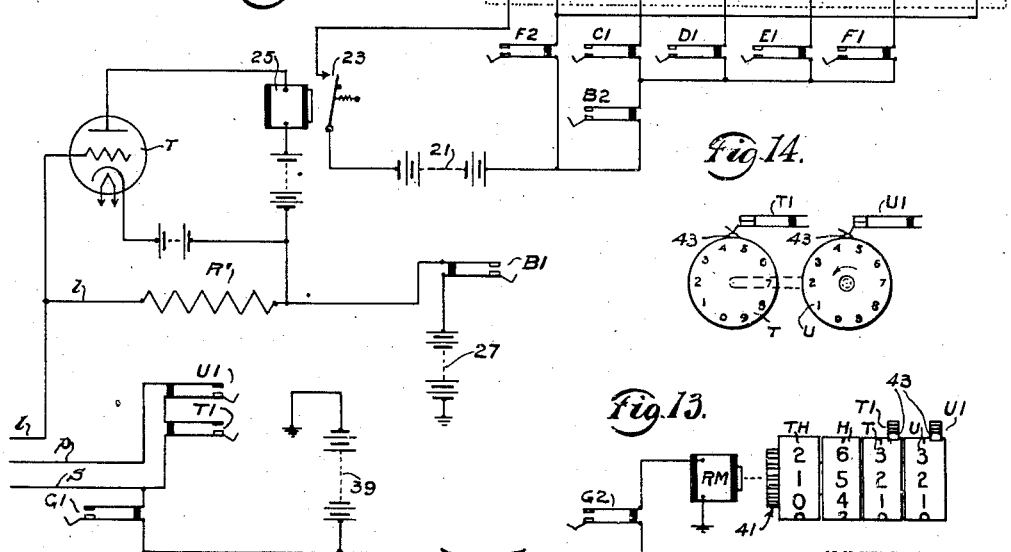
INVENTORS:
Ward Leathers,
Hugo Panissidi.
BY
ATTORNEY Patented Mar. 14, 1944

2,344,254

UNITED STATES PATENT OFFICE 2,344,254

TELEMETERING APPARATUS

Ward Leathers, Brooklyn, and Hugo Panissidi, Jamaica, N. Y., assignors to International Business Machines Corporation, New York, N. Y., a corporation of New York Application January 27, 1943, Serial No. 473,725

6 Claims. (Cl. 234—1.5)

The present invention relates to telemetering apparatus, and more particularly to signal transmitting apparatus which is capable of rendering a reading at a central station of a meter having a multi-digit indicator located at a remote point. The improved telemetering apparatus, comprising the present invention, is primarily adapted for use in connection with metering systems of the type ordinarily employed for registering the volume consumption of a metered commodity which may, for example, be electricity, gas, water or the like and, for purposes of illustration, the invention has been shown and described in connection with a watt-hour meter, the indicating register of which is in the form of a step-up cyclometer device having indicator wheels which are intermittently advanced or rotated throughout an angle of 36° to present to view the ten numerals from 0 to 9 of the Arabic system and which represent the units, tens, hundreds and thousands digits respectively. In the system illustrated, provision is also made for transmitting to the central station an additional series of digits for reading purposes which are indicative of an arbitrary meter identification figure or number, by means of which that particular meter may be distinguished from a large number of similar meters arranged in a group and coming under the control of one of various secondary selectors, which in turn are grouped and come under the control of one of various primary selectors through which the various readings are transmitted to the central station.

The invention in its broadest aspect, however, is capable of other uses and the same may be employed for the transmission of readings of meterological or other scientific instruments to a remote point and for the registering or recording of these readings in various ways at will or at predetermined intervals. Broadly, therefore, the invention contemplates the provision of an apparatus whereby a physical responsive effect is produced in accordance with an initiating change, and has particular reference in this broad sense to an apparatus whereby a counter is actuated, a pointer is positioned, a recording is made or some other mechanism is actuated in accordance with the physical movement of a member, which may be, for example, a meter indicator or dial, a liquid level gauge or the like.

It is among the principal objects of the present invention to provide a fully automatic telemetric system wherein the rotary motion of an indicating member, such as a cyclometer wheel in an electric watt-hour-meter which is initiated according to decimal integration, may be discriminated and by the discrimination process converted into recorded linear telegraphic code expressive of the various Arabic numerals. A similar object is to provide a fully automatic telemetering system which additionally provides for the identification of each meter read, such identification also being made according to the same linear telegraphic code that is employed for reading the meter indications.

Another object of the invention is to provide a telemetering system designed for use in connection with the reading of a multiplicity of meters and which, for this purpose, utilizes an impulse signaling system wherein short durational impulses are transmitted to the central station that are indicative of the various meter identification data and of changes in the measured quantity as registered by the various meters, such a system being more stable in its operation than many present day systems wherein varying currents proportional to the measured magnitude are set up in the reading circuit and discriminated against at the central station on a marginal basis for determining the meter identification number and reading.

A still further object is, in a system of the character set forth above, to provide a novel form of rotary code unit designed for use in connection with a rotary member, the movements of which are to be determined at a remote point and which derives its movement from the rotary member and operates to translate the rotary motion of the member, as expressed in decimally separated Arabic numerals representing the various index positions of the movable member, into linear telegraphic code, the coding operation taking place solely by virtue of the rotary code wheel and its association with the rotary member whose position it is desired to determine and record at the central station.

Yet another object of the invention is to provide a code wheel of this sort which is relatively simple in its construction and wherein a plurality thereof may readily be assembled in a meter construction of the type employing indexible cyclometer wheels without taking up an appreciable amount of space and without increasing the distance between adjacent cyclometer wheels.

Another object of the invention is to provide a fully automatic telemetering system, of the character outlined above, in which the operations thereof are controlled by means of rotary contact making and breaking cam devices located at the central station and capable of actually establishing certain circuits and of potentially establishing other circuits, which latter circuits are completed or are not completed, depending upon the selective code character setting-up action of the rotary code wheels located in the various meter cyclometer units.

With these and other objects in view, which will become more readily apparent as the nature of the invention is better understood, the same consists in the novel construction, combination and arrangement of parts shown in the accompanying three sheets of drawings forming a part of this specification and in which:

Fig. 1 is an open front elevational view of a cyclometer wheel assembly employed in connection with the present invention.

Fig. 2 is an end elevational view thereof.

Fig. 3 is a side elevational view of a contact mechanism employed in connection with one of the cyclometer wheels shown in Fig. 1.

Fig. 4 is a fragmentary front elevational view, partly in section, of one of the cyclometer wheels and its contact mechanism.

Fig. 5 is a sectional view taken substantially along the line 5—5 of Fig. 1.

Fig. 6 is a sectional view taken substantially along the line 6—6 of Fig. 5.

Fig. 7 is a rear elevational view of the disclosure of Fig. 5.

Fig. 8 is a diagrammatic view of a meter construction, together with an indexing mechanism employed in connection therewith.

Fig. 9 is a diagrammatic view of a primary and secondary selector mechanism employed in connection with the present invention.

Fig. 10 is a fragmentary diagrammatic view of a control unit together with the driving mechanism therefor.

Fig. 11 is a time graph chart of the control mechanism of Fig. 10.

Fig. 12 is a diagrammatic view of the electrical connections for the control mechanism at the central station.

Fig. 13 is a diagrammatic view illustrating the manner in which a talley is kept of the number of meters which have been read according to the present invention.

Fig. 14 is a fragmentary diagrammatic view of the apparatus shown in Fig. 13.

Fig. 15 is a fragmentary plan view of a strip of tape perforated in accordance with a selected code employed in connection with the present invention.

In all of the above described views like characters of reference are employed to designate like parts throughout.

*Brief description*

Briefly, the invention contemplates the provision of a recording mechanism located at the central station and including a perforator having a series of perforating magnets adapted to be selectively energized according to the identification and reading of the various meters. Suitable perforating punches controlled under the influence of the perforating magnets are actuated and caused to perforate the telemetered data according to a selected code one index position point at a time on a continuous strip of record tape. After the number of index position points sufficient to make up one complete coded character has been perforated in the tape, the tape is advanced or indexed and the perforation of the next character is commenced. A plurality of normally open pairs of contacts, each of which controls the operation of one of the perforating magnets, are adapted to be successively closed under the influence of a cam actuated contact timing control system to potentially close local circuits through the various magnets. The common return circuit for the various magnets is normally maintained open but is adapted to be closed only when a particular index position point of a coded character is to be perforated in the tape and closing of the circuit is controlled according to conditions existing at the meter undergoing reading. Toward this end, the circuit is adapted to be closed under the influence of plate current flowing in an electronic circuit employing a vacuum tube by means of a suitable relay solenoid placed in the plate circuit of the tube.

A combined selecting and reading circuit leading from the central station to the meter undergoing reading includes a fixed resistor and the resistance of the coil of an electromagnet arranged in series in the circuit. The normal voltage drop across the resistor is utilized to apply a grid voltage to the tube of insufficient extent to allow the tube to pass the requisite current for operation of the relay in its plate circuit, and thus the common return circuit for the perforating magnets remains open so that no perforating operations may take place. The electromagnet whose coil is disposed in the reading circuit in series with the resistance, is utilized to operate a stepping or selecting switch, by means of which certain established coding circuits are selected for reading purposes. The electromagnet which controls the operation of the selecting switch also operates when energized to close a pair of normally open contacts, by means of which a second resistance is potentially placed in the reading circuit in parallel with the resistance of the coil. The two resistances just mentioned are preferably of equal value and thus, when the last mentioned resistance is actually connected in the reading circuit in parallel with the resistance of the coil, current flow in the circuit will materially increase and the bias placed upon the tube by virtue of the increased voltage drop across the bias resistor at the central station will become altered to the extent that the tube will pass sufficient current to actuate the relay and complete the common line of the various perforating magnets.

Actual connection of the parallel arrangement of resistances in the circuit, however, is controlled by means of a rotary coding unit, one of which is associated with each cyclometer wheel in the meter undergoing reading. Each coding unit is mounted upon a respective cyclometer wheel and is controlled by the angular position assumed by the latter. Depending upon the position of its respective cyclometer wheel, one or more circuits out of a possible total of four coding circuits are established and the scanning arm of the selector switch is allowed to select or scan these circuits successively. Simultaneously with the scanning of the coding circuits at the meter, the control cam at the central station, operating in phase with the scanning arm, closes the various pairs of contacts by means of which the circuits leading to the perforating magnets are closed. As the scanning arm of the selector switch encounters a potentially closed coding circuit, the parallel arrangement of resistances are set up in the reading circuit and the tube is energized, whereupon the common line for the perforating magnets is completed and code perforation takes place in the perforator one index position point of a character at a time.

The selector switch is wired for the scanning of four sets of four coding circuits each, since the meter ordinarily employs a cyclometer arrangement having four wheels. This switch is also wired for the transmission of three identifying numbers and thus provision is made for the transmission of seven characters to the central station in all. Provision is also made at the central station for periodically selecting and actuating or "pulsing" the various secondary selectors, such selection being resorted to after each group of ninety-nine meters have been read. Similar pulsing of the primary selectors is provided for at the central station.

*The meter register construction*

Referring now to Figs. 1 to 7, inclusive, each meter is provided with an indicating register in the form of a cyclometer mechanism designated in its entirety at 10, and which includes a generally triangular frame-like structure having end plates 12 which are maintained spaced from each other by means of through-bolts 14. A horizontal supporting shaft 16 has its ends anchored in the end plates 12 substantially centrally thereof and serves to support thereon a more or less conventional veeder type of cyclometer mechanism, including cup-shaped cyclometer wheels 18, of which there are four in number, and having indicia 20 thereon representing on the various wheels units, tens, hundreds and thousands digits respectively of the meter reading.

Each of the cyclometer wheels 18 is formed with a central sleeve portion 22 which surrounds the shaft 16 and is loosely mounted thereon. An insulating sleeve 24 is pressed upon the sleeve portion 22 and serves to support thereon a compound switch contact assembly 26 which forms the rotary element of a two-part rotary switch assembly 28 (see Fig. 5). The other part of the assembly 28 is in the form of a stationary plate 30 formed of insulating material and having spaced apertures 32 extending therethrough in the lower regions thereof. The lower bolts 14, which form a part of the cyclometer framework, are received through the apertures 32 of the plate 30 and a plurality of spacing sleeves 34 surrounding the bolts 14 serve to space the various plates 30 one from another and from the end plates 12.

The switch assembly 28 is designed to selectively close one or more of a series of signaling circuits in such a manner that the rotary motion of its respective cyclometer wheel 18 may be converted into the recorded linear telegraphic code expressive of the various indicia appearing on the surfaec of the cyclometer wheel and which, since they are in the form of Arabic numerals, are ten in number and are decimally sparated. The linear code, which is expressive of the various Arabic numerals, is purely arbitrary and may vary considerably in its form. However, for purposes of illustration, the various switch assemblies 28 are designed to convert the rotary motion of the cyclometer wheels 18 into code substantially as shewn in an application of Ward Leathers, Serial No. 462,202, filed October 15, 1942, for Data storing device and data selecting means therefor. This code is essentially a four line code.

Toward this end, a plurality of contact bars 36 are suitably secured, as, for example, by means of rivets or the like, to the inner face of each of the insulating plates 30. These bars are provided with parallel extending portions 38 which terminate in their upper regions in curved nested portions 40, the innermost curved nested portion completely surrounding the central aperture through which the shaft 16 extends and the other curved nested portions terminating at convenient points adjacent each other on one side of the plate 30. The various bars 36 are, of course, spaced from one another and each constitutes a common contact strip for a plurality of contact plugs 42, which are generally in the form of conducting rivets extending completely through the various bars 36 and the plate 30 and which also assist in maintaining the bars in position on the plate 30. The various contact plugs 42 are designed to make contact in passing with a series of contact brushes 44 provided on the contact assembly 26 and the position of these plugs on the various bars 36 and of the brushes on the assembly 26 is such that as the asssembly 26 rotates, one or more circuits periodically become closed to produce the Telelector code at the central station by a discrimination process subsequently to be described.

Referring now to Figs. 3 and 4, the contact assembly 26 is formed in three parts, which parts are designated at $a$, $b$ and $c$ respectively. Each of the parts $b$ and $c$ carries thereon two of the contact brushes 44, while the part $a$ serves as a connecting member for these parts to hold the entire assembly together. The part $c$ is generally of horseshoe design and includes an outer arcuate bend 46 and an inner U-shaped bend 48, the ends of the two bends 46 and 48 merging together as at 50. The member $b$ likewise includes an outer arcuate bend 52 and an inner arcuate bend 54, the ends of which merge as at 56. The member $a$ is in the form of a spider of irregular star-shaped configuration having two free ends or points to which the portions 50 of the member $c$ are anchored and having two additional free ends or points to which the portions 56 of the member $b$ are anchored. The member $a$ thus serves to join the parts $b$ and $c$ together, both electrically and mechanically, and afford a unitary structure. The two contact brushes 44 on the member $c$ are afforded by virtue of relatively small U-shaped protuberances provided medially of the two bends 46 and 48 of this member. Similarly, the two contact brushes 44 of the member $b$ are afforded by means of protuberances located medially of the two bends 52 and 54 thereof. The four contact brushes are in alignment and occupy respective positions in a common diametrical plane extending across the assembly 26.

If desired, the four contact brushes 44 may conveniently be grouped in alignment on one side of a center line of the contact brush assembly 26 and a simplified arrangement of the various contact plugs 42 on the bars 36 resorted to. However, in order to more perfectly balance the entire assembly, two of these contact brushes are positioned on one side of the center line and the other two on the other side thereof. This arrangement results in a more complicated disposition of the contact plugs 42 and it is thought unnecessary to enter into a detailed description of the spacing of the various contact plugs relative to the contact brushes. It is deemed sufficient to state that the various plugs 42 are arranged in four circumferentially but unequally spaced series in such a manner that as the brushes 44 simultaneously sweep along the surface of their respective bars 36, contact plugs are engaged in passing and circuits are closed which will produce a representation of the Arabic system of digits in the Telelector code successively.

A common return contact strip 58 is suitably secured by means of rivets or the like to the outer side of the insulating plate 30 and includes a straightaway portion 60 and a circular portion 62 surrounding the central aperture through which the shaft 16 extends. The various bars 36 and the strip 58 project downwardly a short distance below the lower edge of the plate 30 and afford anchoring points to which the various telemetering circuit wires may be soldered.

It is to be noted at this point that the thickness of the assembled switches 26 is relatively small and, as a consequence, these assemblies may conveniently be received between adjacent cyclometer wheels 18 on the shaft 16 without necessitating widening the distance between these wheels. The switch assemblies 26 are thus readily adaptable to existing commercial cyclometer assemblies without appreciably modifying the constructional details thereof. Furthermore, since the three elements a, b and c may conveniently be manufactured from light spring sheet metal stampings the assemblies are not costly to manufacture nor are they difficult to install.

Referring now to Fig. 2. The shaft 16 has mounted thereon a ratchet wheel 64 which cooperates with a pawl 66 in driving relationship. The pawl 66 is pivotally connected as at 68 to the free end of an armature 70 of an electro-magnet 72, having circuit connections 74, by means of which the electro-magnet 72 may periodically be actuated or pulsed according to the volume consumption of the metered product.

The selector switch

Referring now to Fig. 8, the cyclometer assembly 10 is diagrammatically represented, and, for convenience, the various contact assemblies 26 are shown in side-by-side endwise relationship. The contact bars 36 of each assembly are electrically connected to adjacent contacts 76 included in a selector switch assembly 78, the various groups of contacts to which the contact bars 36 are connected being arranged sequentially around the peripheral regions of the switch. Three additional groups of contacts 76, each group including four such contacts, are also provided in the switch 78 for the purpose of affording identification of the meter at the central station in a manner that will appear presently. The common return contact strips 58 associated with the four switch assemblies 26 are electrically connected together in common and are grounded as at 80. The switch 78 is provided with a rotary sweep arm 82 designed for successive engagement with the various contacts 76 and this sweep arm is adapted to be electrically connected through a fixed resistor R and a normally open pair of contacts 84 in the reading line l leading from the meter to the central station through conventional primary and secondary selectors 86 and 88 respectively. The sweep arm 82 is adapted to be periodically indexed by means of a ratchet and pawl mechanism 90, the movements of which are controlled from the armature 92 of an electromagnet 94. The pair of contacts 84 are adapted to be closed upon energization of the magnet 94 and, toward this end, a thrust member 96 mounted on the armature 92 cooperates with the contacts 84 in such a manner that when the armature is attracted these latter contacts become closed.

One end of the coil of the electromagnet 94 is grounded as at 98 and the other end thereof is electrically connected to the reading line l and thus exists in the reading line in potential parallel relationship to the resistor R. Inasmuch as identification of each meter at the central station is rendered in the form of the selected four line code, one or more of the contacts 76 of the three groups thereof, which are employed for identification purposes, is electrically connected by a common connection to ground at 98.

It will be seen that upon application to the reading line l of a current impulse, the coil 94 will immediately become energized, whereupon the ratchet mechanism 90 will become retracted preparatory to its operative switch advancing stroke, while at the same time the pair of contacts 84 will become closed, thus placing the resistor R in parallelism with the coil of the electromagnet 94 when the sweep arm 82 affords a path for current to ground. When the sweep arm 82 does not afford a path for the current to ground closing of the pair of contacts 84 is without effect. The sweep arm 82 is periodically advanced in a counter-clockwise direction, as indicated by the arrow in Fig. 8, from contact to contact, each movement thereof representing the completion of the cycle of operations just described in connection with the meter indexing mechanism. Inasmuch as the various peripheral contacts of the switch 78 are arranged in groups, with the contacts of each group being connected to respective contact bars 36 of a switch unit 26, the sweep arm 82 in passing will serve to select one index position point of a coded character at a time until four such characters representing the meter reading have been selected. Thereafter, the sweep arm 82 will scan the various contacts 76 of the meter-identifying groups one at a time until such a time as three coded characters have been selected.

The primary and secondary selectors

Referring now to Fig. 9, the arrangement of the various primary and secondary selectors 86 and 88 respectively is more or less conventional in design and no claim is made herein to any novelty associated with the same. Reference may be made to the patent to Ward Leathers, No. 2,285,819, dated June 9, 1942, for Meter reading apparatus for a full disclosure of such selecting mechanisms. For the purpose of description thereof, it is deemed sufficient to state that the reading lines l coming from each meter are connected to various contacts 100 in the secondary selector switch 102, wherein they are selected and connected to similar contacts 104 of the primary selector switch 106. A second level 108 of the switch 106 serves to maintain the proper channels for indexing the secondary selector switch 102. The reading line l is shown as being continued through the secondary and primary selector switches 102 and 106 respectively, while the line by means of which the secondary selector switch is indexed is indicated at s. Similarly, the line by means of which the primary selector switch 106 is indexed is designated at p, these three lines being shown in Fig. 9 as emerging from the primary selector at the lower right-hand corner thereof in physical parallelism.

The central station

Referring now to Fig. 12, wherein the arrangement of mechanism at the central station is diagrammatically shown, a more or less conventional perforator is designated in its entirety at 11 and includes a series of perforating magnets 13, the individual magnets being labeled 1, 2, 3 and 4, according to the particular index position point which they control. The magnets 13 have associated therewith suitable punches (not shown) by means of which perforations are applied to a movable tape in the various index position points thereof. No claim is made herein to any novelty in connection with the perforator 11 and reference may be had to the above mentioned application of Ward Leathers, for a full disclosure of such a perforator and its punches. In addition to the magnets 13, the perforator is provided with a tape driving magnet 15 labeled TD and a center drive hole perforating magnet 17 labeled TP. The function of the magnet TD is to advance or index the tape in step-by-step fashion, while the purpose of the magnet TP is to operate a suitable punch (not shown), by means of which the drive holes are applied to the tape.

According to the selected code, one or more of the magnets 13 is or are adapted to be energized to produce a single character on the tape, energization of the magnets taking place in succession under the control of a series of rotary cam members 33 (see Fig. 10) mounted upon a common drive shaft 35 which is driven from a motor M through a gear reduction device 37, the entire cam assembly being designated in its entirety at 19 and being hereinafter referred to as a cam actuated contact timing device. This cam actuated contact timing device is diagrammatically or graphically represented in Fig. 11. After circuits have been closed to potentially apply three coding impulses to one or more of the various magnets 13, means are provided for potentially applying an impulse to the fourth coding magnet 13, while simultaneously energizing the tape driving magnet 15 and the tape perforating magnet 17. In other words, at such time as the last index position point is applied to the tape by actually perforating the tape or by closing a circuit for potentially actuating one of the magnets 13, the magnets 15 and 17 are simultaneously actuated so that a drive hole perforation will be applied to the tape and the tape will be advanced one step preparatory to perforation of the next character one index position point at a time. The tape driving magnet 15 and the tape perforating magnet 17 are arranged in parallel and energization thereof is controlled by means of a switch F2. Energization of the magnet 13, labeled I, is controlled by a normally open switch C1. Energization of the second magnet 13 is controlled by a pair of normally open contacts D1. Energization of the third magnet 13 is similarly controlled by means of a pair of contacts E1, while the fourth magnet in the series is controlled by means of a pair of contacts F1. One contact of the pair F2 is connetced to one terminal of a battery 21. One terminal of each of the switches C1, D1, E1 and F1 is connected through a pair of contacts B2 to the battery 21. The other terminal of the battery 21 is connected through a relay controlled switch 23 to a common line leading to the various magnets in the perforator. The switch 23 is normally maintained open but is adapted to become closed upon energization of an electromagnet 25 carried in the plate circuit of a vacuum tube T. It will be seen that as long as the electromagnet 25 remains unactuated, the switch 23 will remain open, thus maintaining the common line to the various magnets of the perforator open and preventing any tape perforating or tape advancing operations. Upon closing of the switch 23, the common line leading to the various magnets of the perforator is connected to the battery 21 and tape perforating or driving operations may take place, depending upon which of the various contacts F2, C1, D1, E1 and F1 may happen to become closed during one discrimination cycle.

Referring now to Figs. 8 and 12, as has already been pointed out, the resistor R is capable of being placed in parallel with the resistance of the coil of the electromagnet 94 by closing of the contacts 84. The winding of the magnet 94 is normally in series in the reading line with a resistance R' located at the central station and current issuing from a battery 27 and passing through a pair of normally open contacts B1 will flow first through the resistance R' and thereafter through the winding of the coil of the magnet 94 to ground at 98. Thus, an impulse will be applied to the coil of the electromagnet 94 each time the pair of contacts B1 become closed. Reference to Fig. 11 will show the fact that the pair of contacts B1 are caused to become closed during each index movement of the drum 19. The resistor R' is connected in the grid circuit of the vacuum tube T and normally applies a grid bias to this tube, which is insufficient to allow the tube to pass plate current of sufficient strength to fully energize the relay magnet 25. This grid bias phenomenon exists by virtue of the fact that the voltage drop across the resistor R' is too negative to allow the necessary amount of plate current to flow. Under such conditions, the switch 23 will normally remain open and no perforating operations may take place. This condition will obtain whenever the sweep arm 82 rests upon a contact 76 which is not connected to ground at 80 through the particular selected contact switch unit 26. However, whenever the sweep arm 82 is in engagement with a contact 76 which is connected to ground at 80 through one of the contact switch units 26, current issuing from the battery 27 and passing through the resistor R' will divide at the meter; part of it going through the coil of the magnet 94 and the other part thereof passing through the pair of contacts 84, resistor R, switch 78, contact unit 26 to ground at 80. The creation of this second path for current at the meter through the resistor R will allow an additional amount of current to flow in the reading circuit. Thus the voltage drop existing across the resistor R' will be increased accordingly, thereby rendering the grid of the tube T more positive and causing it to pass sufficient current to fully energize the relay magnet 25. Under such conditions, the switch 23 will become closed, thereby connecting the common line leading from the various perforating magnets to the battery 21 so that these magnets may become energized according to the manner in which they are controlled under the influence of conditions existing at the meter.

The sweep arm 82 of the switch 78 is adapted to be rotated in synchronism with the movements of the timing mechanism 19 at the central station. In the diagrammatic view shown in Fig. 11, the space existing between each adjacent horizontal pair of division lines represents one of the rotary cams 33 shown in Fig. 10. The space existing between each of the vertical division lines represents an index position point of the system. It will be seen that the pair of contacts B1 are adapted to be periodically closed each time the timing device is indexed and thus successive impulses are repeatedly applied to the magnet 94 so that the sweep arm 82 is maintained in phase or synchronism with the movements of the timing mechanism. Each time the magnet 94 becomes energized, the pair of contacts 84 become closed and the resistor R is potentially placed in parallel with the resistance of the magnet 94. Unless, however, the sweep arm 82 rested upon a grounded contact 76, no current increase in the reading line will be instituted. When the arm 82, however, does rest upon a grounded contact, such increase of current will occur in the circuit by virtue of the parallel arrangement of resistances previously described, and when this occurs the switch 23 will become closed.

The switch B2, like the switch B1, is similarly adapted to be closed upon each indexing movement of the timing mechanism. This latter switch is provided for stabilizing purposes and otherwise has no special function in the discriminating apparatus. The contacts C1, D1, E1 and F1 are controlled by the timing mechanism 19 in such a manner that they will become successively closed in the order mentioned, while at the same time the sweep arm 82 at the meter 10, moving in phase with the various rotary cams, will advance in step-by-step fashion and scan the four contact bars 36 of the units cyclometer wheel in a selected meter. During occurrence of the following sub-cycle of operation, the four contact bars of the tens cyclometer wheel will be similarly scanned. Upon succeeding cycles, the hundreds and thousands cyclometer wheel contact bars will be likewise scanned. Simultaneously with the scanning of the contact bars of the thousands cyclometer wheel, the contact F2 will become closed, whereupon tape perforating and tape driving magnets will become energized and the tape will be both perforated and advanced in a conventional manner. When all four groups of contact bars 36 of a selected meter have been scanned, the tape will have been advanced four times and four complete characters, each including four index position points, one or more of which will be perforated, will have been applied to the tape. During this time, the timing mechanism will have been indexed sixteen times and the sweep arm 82 will have moved into engagement with the last contact bar of the thousands cyclometer wheel of the selected meter. When the timing mechanism is again indexed, the sweep arm 82 will move into the identifying region of the switch 78 and the mechanism will continue to function substantially in the same manner as previously described with the sweep arm 82 seeking contacts 76 which are grounded, in order that the resistor R may be placed in parallel with the resistance of the magnet 94 to cause an increased voltage drop across the resistance R' for energizing the tube T and closing the switch 23 to connect the common return line of the various perforating magnets in its local circuit for normal actuation of the perforating device as heretofore described. The contacts 76 in the identifying region of the switch 78 are initially wired according to the selected identification number of the meter. After the sweep arm 82 has passed through the identifying region of the switch 78, during which time it will have scanned twelve of the contacts 76 representing three identifying numerals, and the arm again moves to the consumption reading region of the switch, the timing mechanism will have advanced to a point where two pairs of contacts G1 and G2 become closed.

The pair of contacts G1 are positioned in a local circuit including a battery 39 and are adapted, upon closing thereof, to close a circuit to operate the secondary selector 88 (Fig. 9) for indexing purposes. The pair of contacts G2 are positioned in a line leading to a control magnet RM, which serves through a suitable ratchet and pawl mechanism (not shown) to operate a talley register or counter 41 in the form of a cyclometer device, the function of which is to render an indication of the number of meters which have been read and thereby give the operator the number of the meter next to be read. The units cyclometer wheel of the register 41 has associated therewith a pair of contacts U1 adapted to be engaged by an abutment 43 carried by this wheel and closed each time ten meters have been read. The tens cyclometer wheel of the register 41 has associated therewith a pair of contacts T1 adapted to be engaged by a similar abutment 43 and closed each time one-hundred meters have been read. The contacts U1 and T1 are arranged in series in the line leading to the primary selector 86 and, whenever both of these pairs of contacts are closed, and the pair of contacts G1 becomes closed, both the primary and secondary selectors will receive an impulse of current for indexing purposes.

The invention is not to be limited to the exact arrangement of parts shown in the accompanying drawings or described in this specification, as various changes in the details of construction may be resorted to without departing from the spirit of the invention. Only insofar as the invention has been particularly pointed out in the accompanying claims is the same to be limited.

What is claimed is:

1. In an apparatus for indicating at a remote point the relative position of a movable member, a plurality of coding circuits, means for selectively establishing one or more of said circuits according to the various positions capable of being assumed by said member, a reading line leading to the remote point, means for successively connecting said coding circuits in the reading line, means establishing a predetermined fixed resistance in said reading line, a source of current supply for the reading line establishing a predetermined voltage drop across said resistance, a perforator at the central station including a plurality of perforating magnets connected in parallel and having a common return circuit, a normally open relay-actuated switch in said latter circuit, a solenoid operable upon energization thereof to close said switch, thermionic means controlling the energization of said solenoid, said thermionic means being biased by said voltage drop to an extent insufficient to cause energization of said solenoid, means operable when an established coding circuit is connected in the reading line for increasing the current flow in said line to an extent sufficient to alter the bias upon said thermionic means and causing energization of said solenoid, and means operable in phase with said connecting means for successively establishing circuits through said perforating magnets, said latter circuits being adapted to be completed under the influence of said common return circuit.

2. In an apparatus for indicating at a remote point the relative position of a movable member, a plurality of coding circuits, means for selectively establishing one or more of said circuits according to the various positions capable of being assumed by said member, a reading line leading to the remote point, means for successively connecting said coding circuits in the reading line, means establishing a predetermined fixed resistance in said reading line, a source of current supply for the reading line establishing a predetermined voltage drop across said resistance, a perforator at the central station including a plurality of perforating magnets connected in parallel and having a common return circuit, a normally open relay-actuated switch in said circuit, a solenoid operable upon energization thereof to close said switch, means responsive to a predetermined increased voltage drop across said resistance for energizing said solenoid, means operable when an established coding circuit is connected in the reading line for increasing the current flow in said line to an extent sufficient to establish said increased voltage drop, and means operable in phase with said connecting means for successively establishing circuits through said perforating magnets, said latter circuits being adapted to be completed under the influence of said common return circuit.

3. In an apparatus for indicating at a remote point the relative position of a movable member, a plurality of coding circuits, means for selectively establishing one or more of said circuits according to the various positions capable of being assumed by said member, a reading line leading to the remote point, means for successively connecting said coding circuits in the reading line, means establishing a predetermined fixed resistance in said reading line, a source of current supply for the reading line establishing a predetermined voltage drop across said resistance, a perforator at the central station including a plurality of perforating magnets connected in parallel and having a common return circuit, a normally open relay-actuated switch in said circuit, a solenoid operable upon energization thereof to close said switch, means controlling the energization of said solenoid, said means being biased by said voltage drop to an extent insufficient to cause energization of said solenoid, means operable when an established coding circuit is connected in the reading line for increasing the current flow in said line to an extent sufficient to alter the bias upon said means and causing energization of said solenoid, and means operable in phase with said connecting means for successively establishing circuits through said perforating magnets, said latter circuits being adapted to be completed under the influence of said common return circuit.

4. In an apparatus for indicating at a remote point the relative angular position of a rotary member, a plurality of coding circuits, a selector switch including a stationary part and a part movable with said rotary member for selectively establishing one or more of said circuits according to the various angular positions assumed by the member, a reading line leading to the remote point, means for successively connecting said coding circuits in the reading line, means establishing a predetermined fixed resistance in said reading line, a source of current supply for the reading line establishing a predetermined voltage drop across said resistance, a perforator at the central station including a plurality of perforating magnets connected in parallel and having a common return circuit, a normally open relay-actuated switch in said circuit, a solenoid operable upon energization thereof to close said switch, thermionic means controlling the energization of said solenoid, said thermionic means being biased by said voltage drop to an extent insufficient to cause energization of said solenoid, means operable when an established coding circuit is connected in the reading line for increasing the current flow in said line to an extent sufficient to alter the bias upon said thermionic means and causing energization of said solenoid, and means operable in phase with said connecting means for successively establishing circuits through said perforating magnets, said latter circuits being adapted to be completed under the influence of said common return circuit.

5. In an apparatus for indicating at a remote point the relative angular position of a rotary member, a plurality of coding circuits, a selector switch including a stationary part and a part movable with said rotary member for selectively establishing one or more of said circuits according to the various angular positions assumed by the member, a reading line leading to the remote point, means for successively connecting said coding circuits in the reading line, means establishing a predetermined fixed resistance in said reading line, a source of current supply for the reading line establishing a predetermined voltage drop across said resistance, a perforator at the central station including a plurality of perforating magnets connected in parallel and having a common return circuit, a normally open relay-actuated switch in said circuit, a solenoid operable upon energization thereof to close said switch, means responsive to a predetermined increased voltage drop across said resistance for energizing said solenoid, means operable when an established coding circuit is connected in the reading line for increasing the current flow in said line to an extent sufficient to establish said increased voltage drop, and means operable in phase with said connecting means for successively establishing circuits through said perforating magnets, said latter circuits being adapted to be completed under the influence of said common return circuit.

6. In an apparatus for indicating at a remote point the relative position of a movable member, a plurality of coding circuits, means for selectively establishing one or more of said circuits according to the various positions capable of being assumed by said member, a reading line leading to the remote point, means for successively connecting said coding circuits in the reading line, means establishing a predetermined fixed resistance in said reading line, a source of current supply for the reading line establishing a predetermined voltage drop across said resistance, a plurality of work circuits having a common return line, a normally open relay-actuated switch in said return line, a solenoid operable upon energization thereof to close said switch, thermionic means controlling the energization of said solenoid, said thermionic means being biased by said voltage drop to an extent insufficient to cause energization of said solenoid, means operable when an established coding circuit is connected in the reading line for increasing the current flow in said line to an extent sufficient to alter the bias upon said thermionic means and causing energization of said solenoid, and means operable in phase with said connecting means for successively establishing said work circuits, said latter circuits being adapted to be completed under the influence of said common return circuit.

WARD LEATHERS.
HUGO PANISSIDI.